(12) United States Patent
Wenger et al.

(10) Patent No.: US 10,841,602 B2
(45) Date of Patent: Nov. 17, 2020

(54) HIERARCHICAL TILES

(71) Applicant: TENCENT AMERICA LLC, Palo Alto, CA (US)

(72) Inventors: Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/235,918

(22) Filed: Dec. 28, 2018

(65) Prior Publication Data

US 2020/0021827 A1   Jan. 16, 2020

Related U.S. Application Data

(60) Provisional application No. 62/698,534, filed on Jul. 16, 2018.

(51) Int. Cl.
| | |
|---|---|
| *H04N 19/44* | (2014.01) |
| *H04N 19/70* | (2014.01) |
| *H04N 19/176* | (2014.01) |
| *H04N 19/436* | (2014.01) |
| *H04N 19/159* | (2014.01) |

(52) U.S. Cl.
CPC .......... *H04N 19/44* (2014.11); *H04N 19/159* (2014.11); *H04N 19/176* (2014.11); *H04N 19/436* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 2014/0301464 | A1* | 10/2014 | Wu | H04N 19/105 375/240.15 |
| 2015/0023407 | A1* | 1/2015 | Sato | H04N 19/44 375/240.02 |
| 2017/0150186 | A1* | 5/2017 | Zhang | H04N 19/119 |

* cited by examiner

*Primary Examiner* — Dakshesh D Parikh
(74) *Attorney, Agent, or Firm* — Sughrue Mion, PLLC

(57) ABSTRACT

A method for decoding a coded video sequence includes decoding at least one tile which comprises a first tile boundary defined by a first tile layout and a second tile boundary defined by second tile layout, wherein the coded video sequence indicates that at least one first prediction mechanism is available across the first tile boundary, and that the at least one first prediction mechanism is not available across the second tile boundary.

21 Claims, 8 Drawing Sheets

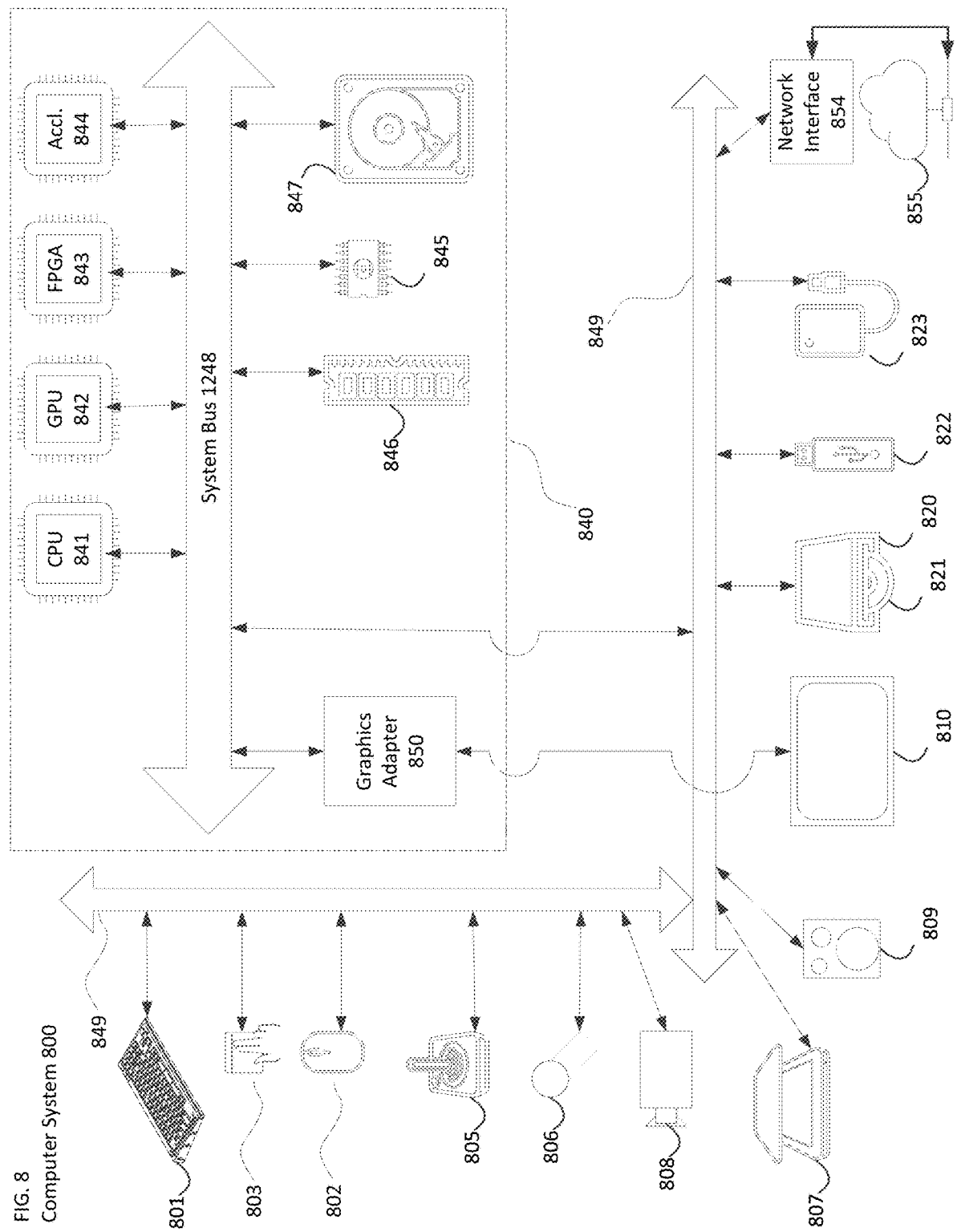

HIERARCHICAL TILES

CROSS-REFERENCE TO RELATED APPLICATION

This application claims under 35 U.S.C. § 119 to U.S. Application No. 62/698,534, filed on Jul. 16, 2018, in the United States Patent & Trademark Office, the disclosure of which is incorporated herein by reference in its entirety.

FIELD

The disclosed subject matter relates to video coding and decoding, and more specifically, to the (simultaneous) use of a plurality of overlapping sets of tiles. One set of tiles can, for example, be designed for the support of parallel encoding, and another to picture partitioning in support of 360 video surfaces, such as, for example, the surfaces of a cube projection. The set of tiles can have differing properties in terms of interruption of in-picture and inter-picture prediction mechanisms across tile boundaries.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Tiles are one mechanism of several available in certain video codecs that help to partition a coded video bitstream. A tile can be a rectangular area of a picture. The scan order of coding units (CUs), also known as blocks, macroblocks, can be local to a tile, top left-to-right, then top-to-bottom. A picture can be separated into a number of tiles wherein each CU can be part of exactly one tile. Prediction of information from outside of a tile can be limited, is hard-coded in the video compression technologies or standards. In H.265, for example, (independent) tiles do not use data from outside CUs of the same picture for the reconstruction of CUs inside the tile, but may use motion compensated sample data from previous pictures in decoding order. Motion constraint tiles do not even use that data and are, in that, comparable to H.263's rectangular slices. Tiles were introduced to enable parallel encoding (and decoding), by allowing each processor or core to focus its attention to only a part of the picture to be coded, in that no communication to processors responsible for other tiles is required except for the final bitstream generation process.

Another bitstream partitioning tool is known as slices. Slices are the collection of coded CUs in scan order. The scan order can be the one of the whole picture (when no tiles are in use) or local within the tile. Certain video compression technologies put certain restrictions on tie interworking between tiles and slices. The main purpose of slices is Maximum Transfer Unit (MTU) size matching—ensuring, that no independently decodable part of a picture spans more than one MTU so to be able to put a slice into a single packet, even if a coded picture may span multiple packets.

The interworking between tiles and slices has been studied, for example, during the standardization process of H.265.

SUMMARY

In an embodiment, there is provided a method for decoding a coded video sequence, including decoding at least one tile which comprises a first tile boundary defined by a first tile layout and a second tile boundary defined by second tile layout, wherein the coded video sequence indicates that at least one first prediction mechanism is available across the first tile boundary, and that the at least one first prediction mechanism is not available across the second tile boundary.

In an embodiment, there is provided a device for decoding a coded video sequence, the device including at least one memory configured to store program code, and at least one processor configured to read the program code and operate as instructed by the program code, the program code including decoding code for decoding at least one tile which comprises a first tile boundary defined by a first tile layout and a second tile boundary defined by second tile layout, wherein the coded video sequence indicates that at least one first prediction mechanism is available across the first tile boundary, and that the at least one first prediction mechanism is not available across the second tile boundary.

In an embodiment, there is provided a non-transitory computer-readable medium storing instructions, the instructions comprising: one or more instructions that, when executed by one or more processors of a device for decoding a coded video sequence, cause the one or more processors to decode at least one tile which comprises a first tile boundary defined by a first tile layout and a second tile boundary defined by the second tile layout, wherein the coded video sequence indicates that at least one first prediction mechanism is available across the first tile boundary, and that the at least one first prediction mechanism is not available across the second tile boundary.

BRIEF DESCRIPTION OF THE DRAWINGS

Further features, the nature, and various advantages of the disclosed subject matter will be more apparent from the following detailed description and the accompanying drawings in which:

FIG. 8 is a diagram of a computer system in accordance with an embodiment.

DETAILED DESCRIPTION

Figure 1:
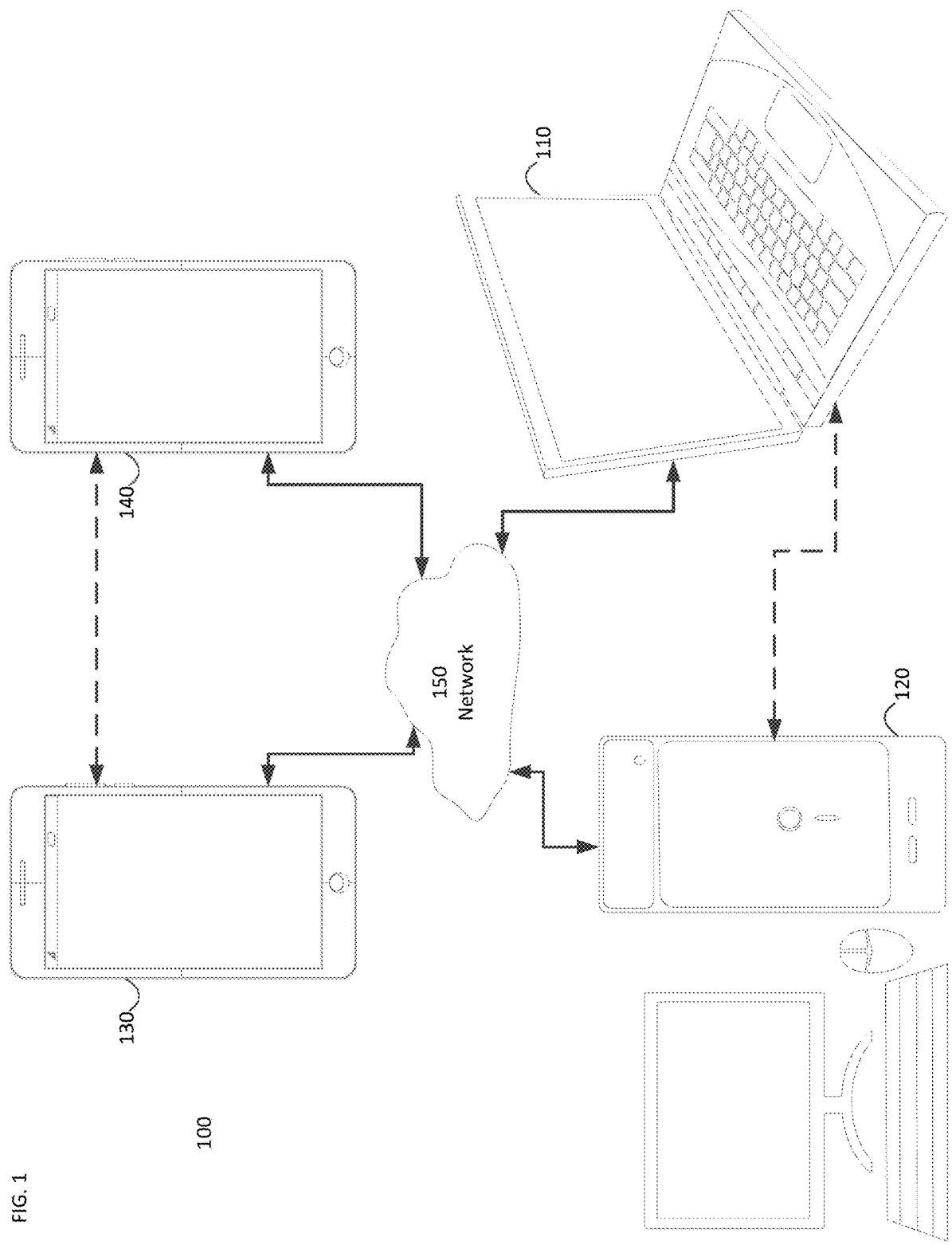
FIG. 1 is a simplified block diagram of a communication system according to an embodiment of the present disclosure.

FIG. 1 illustrates a simplified block diagram of a communication system (100) according to an embodiment of the present disclosure. The communication system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure are not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
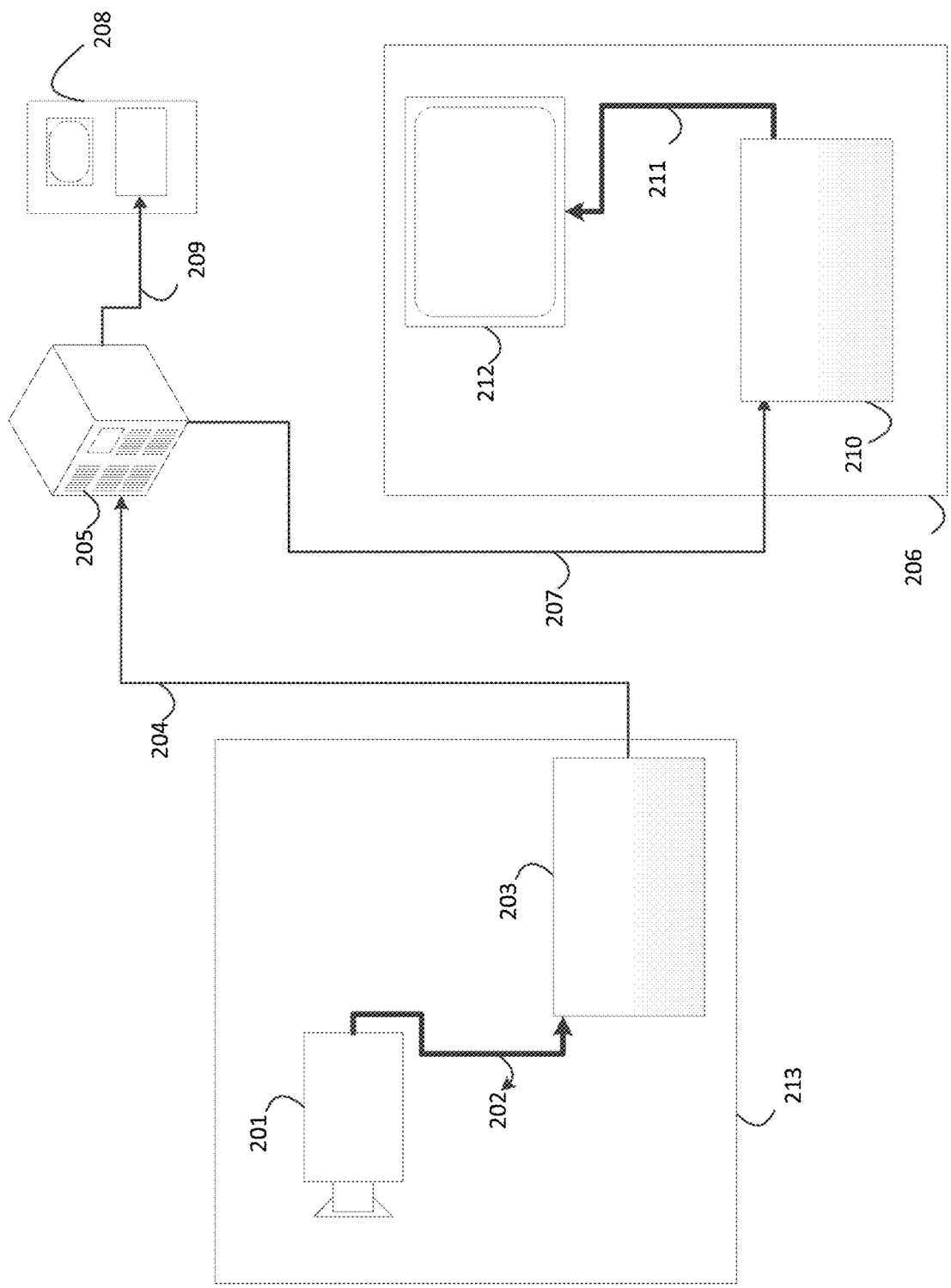
FIG. 2 is a diagram of the placement of a video encoder and decoder in a streaming environment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating, for example, an uncompressed video sample stream (202). That sample stream (202), depicted as a bold line to emphasize a high data volume when compared to encoded video bitstreams, can be processed by an encoder (203) coupled to the camera 201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 3:
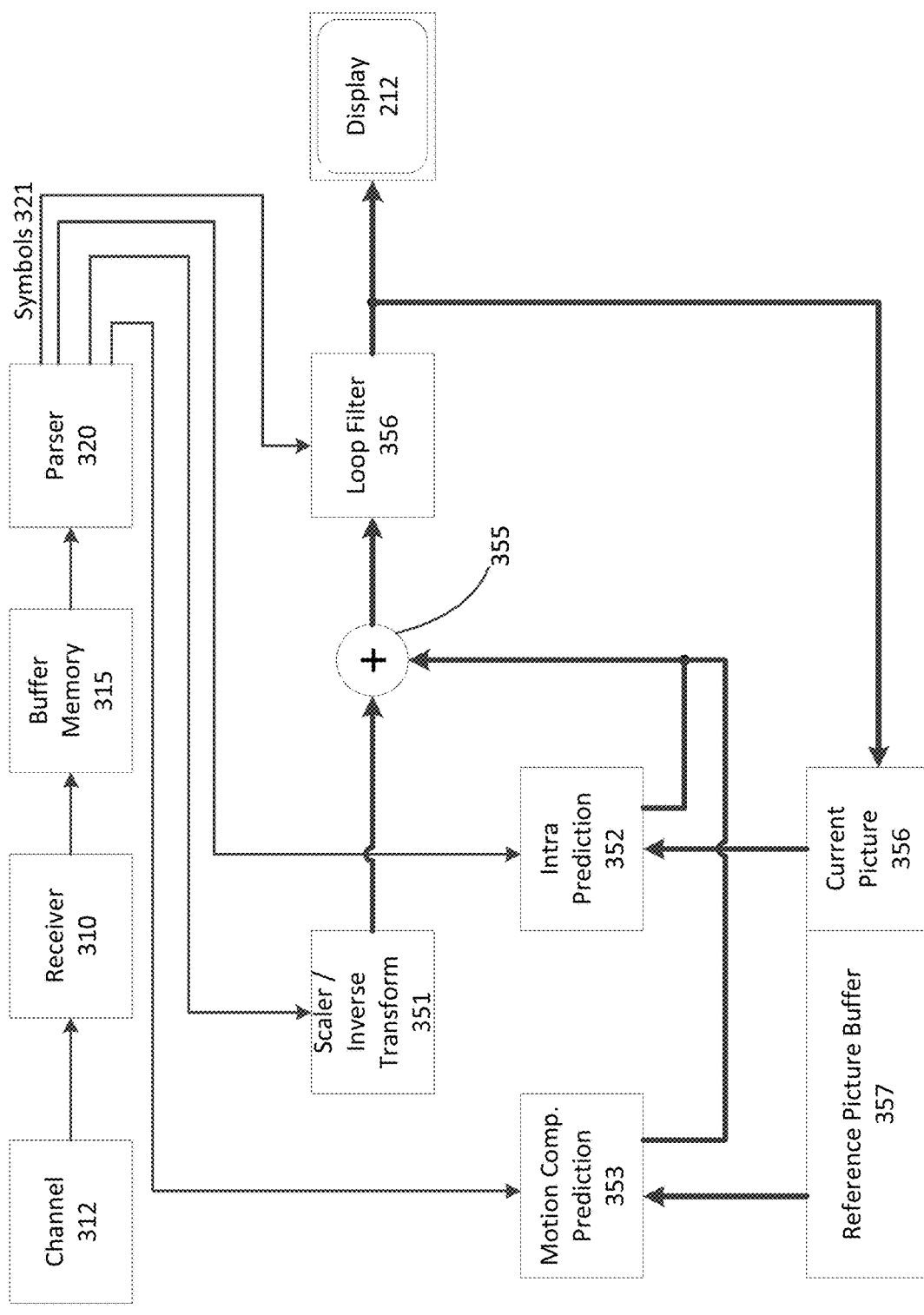
FIG. 3 is a functional block diagram of a video decoder according to an embodiment of the present disclosure.
Figure 4:
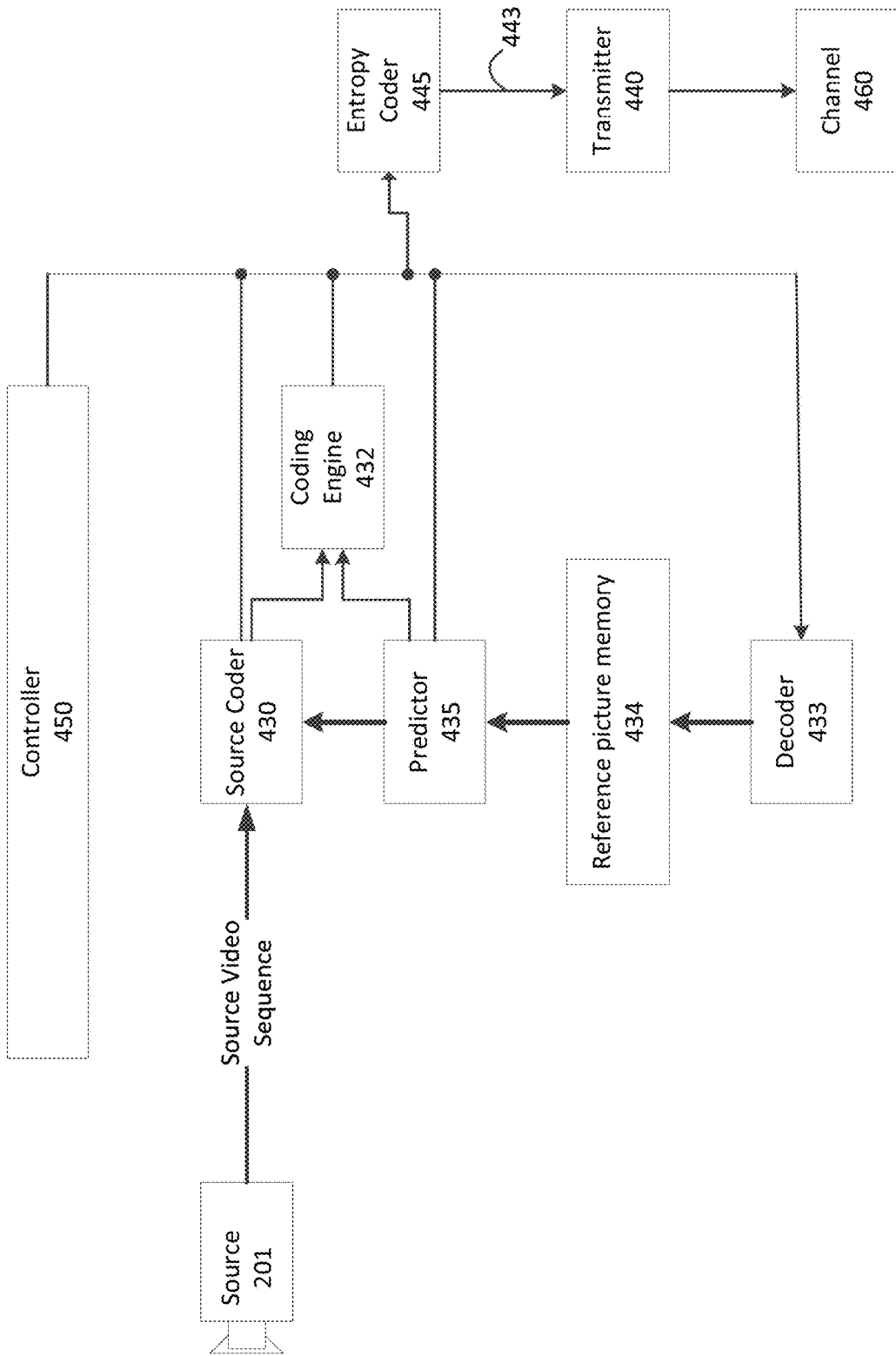
FIG. 4 is a functional block diagram of a video encoder according to an embodiment of the present disclosure.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (320) may perform entropy decoding/parsing operation on the video sequence received from the buffer (315), so to create symbols (321). The parser (320) may receive encoded data, and selectively decode particular symbols (321). Further, the parser (320) may determine whether the particular symbols (321) are to be provided to a Motion Compensation Prediction unit (353), a scaler/inverse transform unit (351), an Intra Prediction Unit (352), or a loop filter (356).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (621) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (656) can become part of the reference picture buffer (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 6:
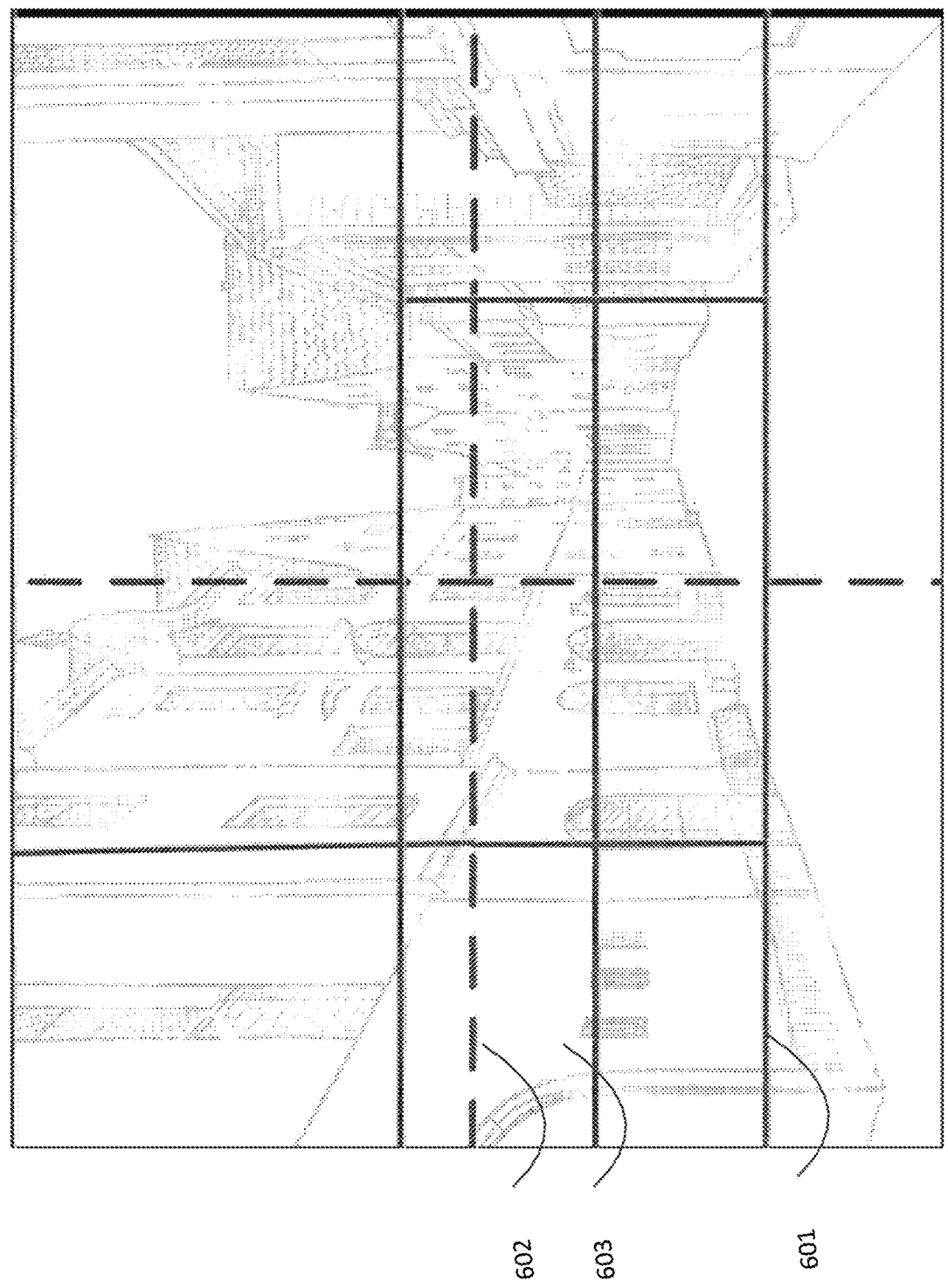
FIG. 6 is a diagram of an example of a hierarchical tile layout, according to an embodiment of the present disclosure.

FIG. 6 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 6, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 6), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Over the recent years, the compression of projected video, for example 360 video, has gained a certain interest. In 360 video, the surface of a sphere may be represented through six planar, square surfaces through cubical projection. The disclosed subject matter can be used in such a scenario. Another use case, which will be used henceforth for the discussion, is the coding of planar surfaces with different, defined region of interests.

Figure 5:
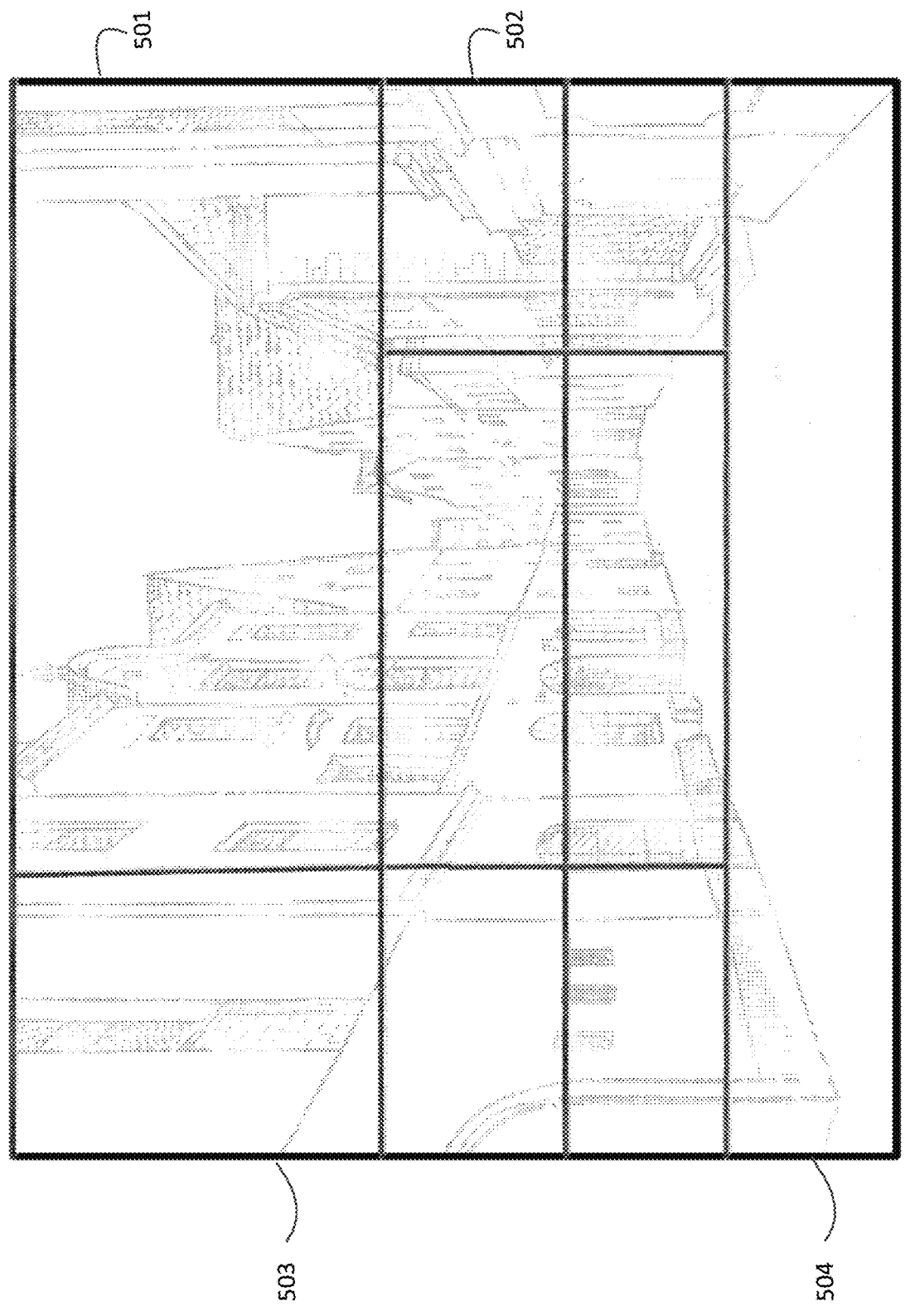
FIG. 5 is a diagram of an example of a flexible tile layout, according to an embodiment of the present disclosure.

Referring to FIG. 5, shown is a scene, for example from a surveillance camera, that is divided into a certain number of tiles (501, 502), shown as rectangular blocks of varying sizes and geometries. In H.265, the subdivision shown may not be possible due to syntax limitations; however, syntax changes have been studied to allow for such partitioning; see, for example R. Sjoberg, et. al., "Flexible Tiles", JVET-K0260, 7/2018, available from http://phenix.it-sudparis.eu/jvet/doc_end_user/documents/11_Ljubljana/wg11/JVET-K0260-v2.zip. The partitioning shown can be used to lump together, in a tile, CUs that cover an area of the scene that has certain properties. For a surveillance camera, for example, tile (501), showing sky, may not be as relevant as, for example, the building entrance captured by tile (502). As already mentioned, tiles can be independently decodable. Accordingly, in a scenario where a decoder has insufficient power to decode the whole scene, it could drop the tile containing the CUs less relevant for the application (such as the CUs in tile 501), and rather decode only the tiles that are relevant (such as: the CUs in tile 502). Similarly, if a selective forwarding unit (SFU) in a network would receive the full scene from a camera, but its outgoing link has insufficient bandwidth, it could perhaps drop the tiles less relevant for the application. This is but one motivation why flexible tiling mechanisms can be useful. Another example can be the sending of all six surfaces of a cube map in a single picture, where each surface is represented by one tile. When rendering the cube in an inverse projection, at most three surfaces are required for rendering from any given viewpoint outside the cube. Accordingly, a minimum of three surfaces neither need to be transmitted nor decoded. Flexible tiling can help partitioning the bitstream accordingly, so that a SFU or decoder can drop the unnecessary tiles containing the unnecessary surfaces based on high level syntax decisions.

Tiles were originally introduced to support encoder parallelism. In such a scenario, the tile layout is largely influenced by the nature of the processor(s) the encoder has available. For example, an encoder running on four cores may split the picture into four rectangular regions of approximately equal size and approximately the same aspect ratio as the source picture, to balance its load. The similar aspect ratio can be advantageous so to leverage two-dimensional coding tools such as intra prediction, motion compensation, and so forth.

Even when H.265's tile syntax were modified as proposed, for example, in Sjoberg et. al, one key problem remains: When tile-partitioning the picture based on application needs, that tile-partitioning may be sub-optimal for parallelization, and vice versa.

There are a number of possible techniques that can be employed to overcome above shortcoming.

(1) Allocation of Tiles by CU Count to Cores/Processors.

Still referring to FIG. 5, in an embodiment, an encoder can use that partitioning scheme and allocate tiles to cores based on the tile size, so that each core would work on tiles involving approximately the same workload. That workload can, for example, be measured as number of samples, number of CUs (assuming CUs are of the same size), or similar measures. As an example, the encoder may allocate tiles (501, 503, 504) to one core and the remaining tiles to the other core, on the theory that tile (501) contains a large area showing sky, which should be easily detectable and has limited relevance in a surveillance scenario and can therefore be easily encoded—hence the larger spatial area of tiles (501, 503, 504) in relation to the remaining tiles does not matter. The expense of such a mechanism can be that tiles a given core is responsible for may not be adjacent, which can lead to additional memory accesses. Memory access can be the core bottleneck in some video encoders. Another issue can be that an application driven tile layout cannot guarantee the availability of tiles of suitable sizes (in terms of numbers of CUs included in the tile). Therefore, a given encoder of n cores, each capable of k CU per time interval, cannot be guaranteed to be able to code a tile-stitched picture of n×k CUs in real time, and the safety factor can be difficult to calculate. This can be critical for real-time applications, because the tile layout in such a scenario can be application driven and the encoder has no choice but to obey the application-driven constraints. In some cases, the encoder may need to be provisioned to handle any application-driven tile layout, and in this case, no encoder based parallelization based on tiles can be assumed, simply because the application may decide to put all CUs into a single tile.

(2) Separate the Functionality of Tiling for Application Needs and Tiling for Parallelism: Hierarchical Tiles.

A cleaner solution may be to separate the functionalities of tiling for the purpose of parallelism and tiling for the purpose of application needs.

Referring to FIG. 6, shown is the same application driven tile layout as in FIG. 5 (shown as solid lines, 601), but with an additional overlay of a 2×2 grid of equally sized tiles (shown as bold, dashed lines, 602) optimized for parallelization. In this scenario, both the thin lines and the boldfaced lines form tile boundaries for the purpose of bitstream construction. Accordingly, the number of tiles into which the picture is divided into increases.

In the same or another embodiment, a parallel encoder operates on this tile layout (created by both thin and dashed lines) in the usual way, except that tiles located in the parallelization tile areas (denoted by the dashed lines) are allocated to and processed by their respective cores. The "application" tile layout is not used for core allocation, although it is observed during the bitstream generation process. Accordingly, parallelization as good as in the absence of an application-driven tile layout can be achieved even with an application driven tile layout. The cost is the use of additional tiles in the bitstream, which can cost additional bits, and can also impair the reconstructed picture quality at the tile boundaries, unless steps to prohibit the latter are taken (which in turn cost additional bits).

(3) Hierarchical Tile Sets.

In H.265 the control information for tile geometry is located in the Picture Parameter Set (PPS). Accordingly, the tile geometry may change form picture to picture. For the purpose of application driven tile layouts, that may be a sensible design choice, because the content of a scene may change rapidly, for example when using pan-tilt-zoom cameras, or fast moving objects and object recognition to identify tile boundaries. However, for the purpose of parallelization, it may not be the best solution—in the encoder architectures dominant today, dynamic allocation of cores to parts of a picture to be coded can happen once at initialization and is henceforth normally kept constant.

To reflect that situation, in the same or another embodiment, the tile control information is split into a hierarchy. The "higher" tile control information represented by dashed lines (602) can be use predominantly for parallelization. It can be coded in a higher level syntax structure (such as the sequence parameter set, SPS), whereas the application-driven tile control information (representing the tile boundaries shown as solid lines, 601) can continue to use the picture parameter set (PPS). Such allocation reflects the static, hardware-driven nature of the parallelization tile layout (602), while respecting at the same time the possible need of dynamic restructuring of application tile layout (601). The allocation of those tile control information to other syntax elements such as other parameter sets, slice header, picture header, GOP header, and so forth, is of course also possible.

It has already been pointed out that bitstream subdivision into tiles can have certain properties in terms of in-picture or inter-picture prediction. While all tile schemes interrupt syntax prediction and reset CABAC, certain tile schemes may allow sample prediction from outside of the tile for the current picture or for reference pictures. By splitting tile control information into a hierarchy, the nature of the prediction per tile boundary can be designed to the needs, for example the needs of the application or the needs of the parallelism. For example, in at least some implementations where tiles are used for parallelism, motion compensation across tile boundaries is possible. This can work because reference pictures may be stored in slow memory that is shared by all cores. On the other hand, for application needs, motion compensation across sample boundaries can be contraindicated, as, across the tile boundary, samples may be present that have little or nothing semantically in common with the samples inside the tile. As an example, consider a tile boundary that runs along cube surfaces in a cube projection. However, the more constraint a tile boundary is, the higher the coding efficiency penalty for a tile boundary can be, not to mention the possible artifacts.

Therefore, it can be useful from a coding efficiency viewpoint to handle tile boundaries introduced for parallelization differently from those introduced for application needs.

In the same or another embodiment, a tile boundary can have control information associated with it, that encoder and decoder can use to determine the extent of prediction across that tile boundary. Such information can be, for example, expressed in a set of flags, where the flags represent the interruption of prediction of certain types, for example syntax prediction, CABAC reset, intra prediction, in picture reference block prediction (aka intra block copy, IBC), motion vector prediction, motion compensated prediction (sample level) and so forth. A person skilled in the art can easily devise the appropriate number of such flags based on the nature of the video coding technology or standard.

Storing such information per tile boundary can be burdensome and inefficient from a rate distortion viewpoint. However, the reason for having different prediction mechanism enabled/disabled for different boundaries can be because of the nature of these boundaries, for example application driven or parallelization driven. Accordingly, in the same or another embodiment, the set of flags can be located and associated with each of the tile hierarchies that are stored, for example in SPS and PPS.

When decoding, the appropriate prediction mechanisms in use can be derived from the control information. The prediction mechanism in use can be different for different boundaries of the same tile. For example, when decoding tile (603), the upper boundary of the tile (603) can have the prediction mechanisms of the SPS associated with (that can, for example, allow motion compensation), whereas the remaining tiles boundaries of tile (603) may have the prediction mechanisms as defined in the PPS—which, for example, may be motion constrained.

Figure 7:
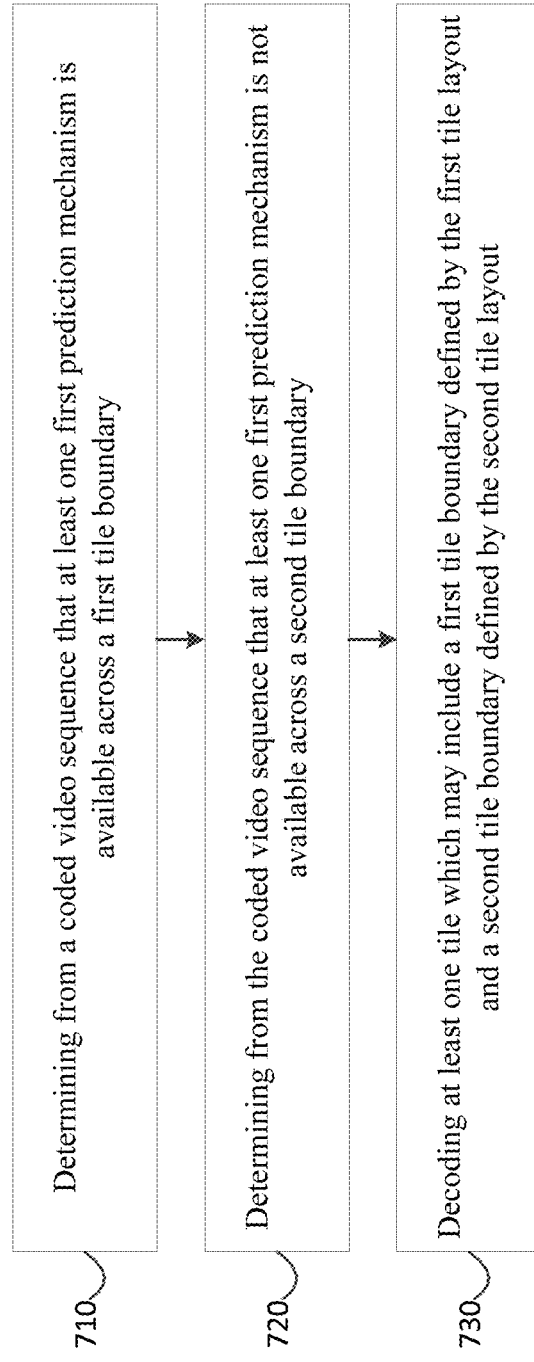
FIG. 7 is a flowchart of an example process for decoding a coded video stream, according to an embodiment of the present disclosure.

FIG. 7 is a flowchart is a flowchart of an example process 700 for decoding a coded video sequence. In some implementations, one or more process blocks of FIG. 7 may be performed by decoder 210. In some implementations, one or more process blocks of FIG. 7 may be performed by another device or a group of devices separate from or including decoder 210, such as encoder 203.

As shown in FIG. 7, process 700 may include determining from the coded video sequence that at least one first prediction mechanism is available across a first tile boundary (block 710).

As further shown in FIG. 7, process 700 may include determining from the coded video sequence that at least one first prediction mechanism is not available across a second tile boundary (block 720).

As further shown in FIG. 7, process 700 may include decoding at least one tile which may include a first tile boundary defined by the first tile layout and a second tile boundary defined by the second tile layout (block 730).

In an embodiment, the first tile layout may include a parallelization-driven tile layout, and the second tile layout may include an application-driven tile layout.

In an embodiment, the coded video sequence indicates that at least one second prediction mechanism is available across the first tile boundary and the second tile boundary.

In an embodiment, the first tile layout is described in a first syntax structure of the coded video sequence, the second tile layout is described in a second syntax structure of the coded video sequence, and the first syntax structure is different from the second syntax structure.

In an embodiment, the first syntax structure is a higher level syntax structure than the second syntax structure.

In an embodiment, the first syntax structure may include a sequence parameter set, and the second syntax structure may include a picture parameter set.

In an embodiment, the first tile layout and the second tile layout are described in at least one from among a sequence parameter set, a picture parameter set, a slice header, a picture header, or a group of pictures header.

In an embodiment, the at least one first prediction mechanism may include at least one from among syntax prediction, context-adaptive binary arithmetic coding reset, intra prediction, in-picture reference block prediction, intra block copy, motion vector prediction, or motion compensated prediction.

In an embodiment, a description of the first tile layout may include a syntax element which indicates that the at least one first prediction mechanism is available across the first tile boundary.

In an embodiment, a description of the second tile layout may include a syntax element which indicates that the at least one first prediction mechanism is not available across the second tile boundary.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, data-glove 804, joystick 805, microphone 806, scanner 807, camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, data-glove 804, or joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example universal serial bus (USB) ports of the computer system 800; others are commonly integrated into the core of the computer system 800 by attachment to a system bus as described below (for example Ethernet interface into a PC computer system or cellular network interface into a smartphone computer system). Using any of these networks, computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators for certain tasks 844, and so forth. These devices, along with Read-only memory (ROM) 845, Random-access memory (RAM) 846, internal mass storage such as internal non-user accessible hard drives, solid-state drives (SSDs), and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include peripheral component interconnect (PCI), USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieve to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for decoding a coded video sequence, the method comprising:
   decoding a tile which comprises a first tile boundary defined by a first tile layout, and a second tile boundary defined by a second tile layout,
   wherein the coded video sequence indicates that at least one first prediction mechanism is available across the first tile boundary, and that the at least one first prediction mechanism is not available across the second tile boundary,
   wherein the first tile layout divides an image included in the coded video sequence into a first plurality of tiles, and the second tile layout divides the image into a second plurality of tiles different from the first plurality of tiles,
   wherein each tile of the first plurality of tiles has a first tile size, and wherein the second plurality of tiles includes tiles having at least three different tile sizes.

2. The method of claim 1, wherein the first tile layout comprises a parallelization-driven tile layout, and
wherein the second tile layout comprises an application-driven tile layout.

3. The method of claim 1, wherein the coded video sequence indicates that at least one second prediction mechanism is available across the first tile boundary and the second tile boundary.

4. The method of claim 1, wherein the first tile layout is described in a first syntax structure of the coded video sequence,
wherein the second tile layout is described in a second syntax structure of the coded video sequence, and
wherein the first syntax structure is different from the second syntax structure.

5. The method of claim 4, wherein the first syntax structure is a higher level syntax structure than the second syntax structure.

6. The method of claim 5, wherein the first syntax structure comprises a sequence parameter set, and
wherein the second syntax structure comprises a picture parameter set.

7. The method of claim 1, wherein the first tile layout and the second tile layout are described in at least one from among a sequence parameter set, a picture parameter set, a slice header, a picture header, or a group of pictures header.

8. The method of claim 1, wherein the at least one first prediction mechanism comprises at least one from among syntax prediction, context-adaptive binary arithmetic coding reset, intra prediction, in-picture reference block prediction, intra block copy, motion vector prediction, or motion compensated prediction.

9. The method of claim 1, wherein a description of the first tile layout includes a syntax element which indicates that the at least one first prediction mechanism is available across the first tile boundary.

10. The method of claim 1, wherein a description of the second tile layout includes a syntax element which indicates that the at least one first prediction mechanism is not available across the second tile boundary.

11. A device for decoding a coded video sequence, the device comprising:
at least one memory configured to store program code; and
at least one processor configured to read the program code and operate as instructed by the program code, the program code including:
decoding code configured to cause the at least one processor to decode a tile which comprises a first tile boundary defined by a first tile layout and a second tile boundary defined by a second tile layout,
wherein the coded video sequence indicates that at least one first prediction mechanism is available across the first tile boundary, and that the at least one first prediction mechanism is not available across the second tile boundary,
wherein the first tile layout divides an image included in the coded video sequence into a first plurality of tiles, and the second tile layout divides the image into a second plurality of tiles different from the first plurality of tiles,
wherein each tile of the first plurality of tiles has a first tile size, and
wherein the second plurality of tiles includes tiles having at least three different tile sizes.

12. The device of claim 11, wherein the first tile layout comprises a parallelization-driven tile layout, and
wherein the second tile layout comprises an application-driven tile layout.

13. The device of claim 11, wherein the coded video sequence indicates that at least one second prediction mechanism is available across the first tile boundary and the second tile boundary.

14. The device of claim 11, wherein the first tile layout is described in a first syntax structure of the coded video sequence,
wherein the second tile layout is described in a second syntax structure of the coded video sequence, and
wherein the first syntax structure is different from the second syntax structure.

15. The device of claim 11, wherein the at least one first prediction mechanism comprises at least one from among syntax prediction, context-adaptive binary arithmetic coding reset, intra prediction, in-picture reference block prediction, intra block copy, motion vector prediction, or motion compensated prediction.

16. The device of claim 11, wherein a description of the first tile layout includes a syntax element which indicates that the at least one first prediction mechanism is available across the first tile boundary.

17. The device of claim 11, wherein a description of the second tile layout includes a syntax element which indicates that the at least one first prediction mechanism is not available across the second tile boundary.

18. A non-transitory computer-readable medium storing instructions, the instructions comprising: one or more instructions that, when executed by one or more processors of a device for decoding a coded video sequence, cause the one or more processors to:
decode a tile which comprises a first tile boundary defined by a first tile layout and a second tile boundary defined by a second tile layout,
wherein the coded video sequence indicates that at least one first prediction mechanism is available across the first tile boundary, and that the at least one first prediction mechanism is not available across the second tile boundary,
wherein the first tile layout divides an image included in the coded video sequence into a first plurality of tiles, and the second tile layout divides the image into a second plurality of tiles different from the first plurality of tiles,
wherein each tile of the first plurality of tiles has a first tile size, and
wherein the second plurality of tiles includes tiles having at least three different tile sizes.

19. The method of claim 1,
wherein applying the first tile layout and the second tile layout simultaneously to the image results in a third plurality of tiles different from the first plurality of tiles and the second plurality of tiles, and
wherein the tile is included in the third plurality of tiles.

20. A method for decoding a coded video sequence, the method comprising:
decoding a tile which comprises a first tile boundary included in a first tile layout and a second tile boundary defined by a second tile layout,
wherein the coded video sequence indicates that at least one first prediction mechanism is available across the first tile boundary, and that the at least one first prediction mechanism is not available across the second tile boundary, wherein the first tile layout divides an image included in the coded video sequence into a first plurality of tiles, wherein the second tile layout divides the image into a second plurality of tiles different from the first plurality of tiles, wherein applying the first tile layout and the second tile layout simultaneously to the image results in a third plurality of tiles different from the first plurality of tiles and the second plurality of tiles, wherein the tile is included in the third plurality of tiles, and wherein a number of tiles included in the third plurality of tiles is larger than a number of tiles included in the first plurality of tiles and a number of tiles included in the second plurality of tiles.

21. The method of claim 1, wherein the first tile boundary is not defined by the second tile layout, and the second tile boundary is not defined by the first tile layout.

* * * * *